US012131611B2

(12) United States Patent
Hawkins et al.

(10) Patent No.: US 12,131,611 B2
(45) **Date of Patent: *Oct. 29, 2024**

(54) SYSTEMS AND METHODS FOR PLAYING AN ELECTRONIC GAME INCLUDING PROGRESSIVE JACKPOT INCREASES BASED ON IN-GAME EVENTS

(71) Applicant: Aristocrat Technologies Australia Pty Limited, North Ryde (AU)

(72) Inventors: Ryan Hawkins, Henderson, NV (US); Robert Honeycutt, Henderson, NV (US); Christopher Barney, Las Vegas, NV (US); Theodore Hase, Las Vegas, NV (US); Yanis Tsombanidis, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,157

(22) Filed: Jun. 20, 2023

(65) Prior Publication Data

US 2023/0334948 A1 Oct. 19, 2023

Related U.S. Application Data

(63) Continuation of application No. 17/508,691, filed on Oct. 22, 2021, now Pat. No. 11,721,172, which is a (Continued)

(51) Int. Cl.
*G07F 17/32* (2006.01)

(52) U.S. Cl.
CPC ...... *G07F 17/3265* (2013.01); *G07F 17/3213* (2013.01); *G07F 17/3246* (2013.01); *G07F 17/3248* (2013.01); *G07F 17/3251* (2013.01); *G07F 17/3258* (2013.01); *G07F 17/3288* (2013.01)

(58) Field of Classification Search
CPC ............. G07F 17/3265; G07F 17/3258; G07F 17/3213
See application file for complete search history.

(56) References Cited

U.S. PATENT DOCUMENTS 7,481,430 B1 1/2009 Jackson
7,666,093 B2 2/2010 Lafky
(Continued)

OTHER PUBLICATIONS

Notice of Allowance dated Mar. 12, 2020, for U.S. Appl. No. 15/479,811 (pp. 1-5).
(Continued)

*Primary Examiner* — James S. McClellan
(74) *Attorney, Agent, or Firm* — Armstrong Teasdale LLP

(57) ABSTRACT

Systems, methods, and articles of manufacture for electronic gaming are disclosed. The method includes generating a plurality of reel strips that each include a column of symbol display positions, where each symbol display position includes a symbol, and evaluating each of the symbols in the symbol display positions. The method also includes determining that at least one of the symbols corresponds to a first in-game event, where the first in-game event is associated with a first value, and adding the first value associated with the first in-game event to a first progressive jackpot.

20 Claims, 9 Drawing Sheets

Related U.S. Application Data continuation of application No. 16/799,453, filed on Feb. 24, 2020, now Pat. No. 11,158,166, which is a continuation of application No. 15/479,811, filed on Apr. 5, 2017, now Pat. No. 10,629,032.

(56) References Cited

U.S. PATENT DOCUMENTS

| | | | | |
|---|---|---|---|---|
| 7,874,915 | B2 | 1/2011 | Caspers | |
| 8,128,489 | B2 | 3/2012 | Jackson | |
| 8,348,754 | B2 | 1/2013 | Jackson | |
| 8,408,993 | B2 | 4/2013 | Lafky | |
| 8,801,520 | B2 | 8/2014 | Lafky | |
| 9,202,338 | B2 | 12/2015 | Lafky | |
| 9,257,008 | B2 | 2/2016 | Plowman | |
| 9,367,995 | B2 | 6/2016 | Boese | |
| 9,582,964 | B2 | 2/2017 | Plowman | |
| 9,805,551 | B2 | 10/2017 | Meyer | |
| 9,990,804 | B2 | 6/2018 | Aoki | |
| 10,255,751 | B2 * | 4/2019 | Boese | A63F 9/24 |
| 2002/0045474 | A1 | 4/2002 | Singer | |
| 2005/0055113 | A1 | 3/2005 | Gauselmann | |
| 2006/0035706 | A1 | 2/2006 | Thomas | |
| 2006/0205491 | A1 | 9/2006 | Daley | |
| 2007/0060271 | A1 | 3/2007 | Cregan | |
| 2007/0202943 | A1 | 8/2007 | Thomas | |
| 2007/0298873 | A1 | 12/2007 | Nguyen | |
| 2009/0104986 | A1 | 4/2009 | Englman | |
| 2009/0264191 | A1 | 10/2009 | Roukis | |
| 2009/0298574 | A1 | 12/2009 | Gauselmann | |
| 2009/0305777 | A1 | 12/2009 | Anderson | |
| 2010/0113131 | A1 | 5/2010 | Aoki | |
| 2013/0196740 | A1 | 8/2013 | Lafky | |
| 2015/0254932 | A1 | 9/2015 | Boese | |
| 2016/0086448 | A1 | 3/2016 | Aoki | |
| 2016/0104344 | A1 | 4/2016 | Meyer | |
| 2016/0328926 | A1 | 11/2016 | Boese | |
| 2018/0040202 | A1 | 2/2018 | Meyer | |

OTHER PUBLICATIONS

Notice of Allowance dated Jul. 1, 2021 for U.S. Appl. No. 16/799,453 (pp. 1-9).

Notice of Allowance dated Mar. 30, 2023 for U.S. Appl. No. 17/508,691 (pp. 1-9).

* cited by examiner

SYSTEMS AND METHODS FOR PLAYING AN ELECTRONIC GAME INCLUDING PROGRESSIVE JACKPOT INCREASES BASED ON IN-GAME EVENTS

CROSS-REFERENCE TO RELATED APPLICATIONS

This application is a continuation of U.S. patent application Ser. No. 17/508,691, filed Oct. 22, 2021, which is a continuation of U.S. patent application Ser. No. 16/799,453, filed 24 Feb., 2020, now U.S. Pat. No. 11,158,166, which is a continuation of U.S. patent application Ser. No. 15/479,811, filed 5 Apr., 2017, now U.S. Pat. No. 10,629,032, the entire contents and disclosures of which are hereby incorporated herein by reference in their entirety.

BACKGROUND

The subject matter of the present disclosure relates to electronic gaming, and more particularly to methods of playing an electronic game including progressive jackpot increases that are based on in-game events.

At least some gaming machines are configured to present a progressive jackpot in conjunction with a base, or primary, game. Specifically, a progressive jackpot may be tied to one or more gaming machines, such that each gaming machine contributes a portion of each bet placed on the machine to a progressive jackpot. The progressive jackpot may therefore increase over time as each gaming machine contributes to the jackpot. The jackpot may be awarded as a result of one or more combinations of symbols in a primary or bonus game. If one of these symbol combinations lands in the primary or bonus game, then all or a portion of the progressive jackpot may be awarded to the player receiving the designated symbol combination.

As the number and variety of available gaming systems increases, gaming systems operators, such as casinos, continue to strive for the design and implementation of new and exciting gaming systems. The present disclosure is therefore directed to such gaming systems. In particular, the present invention is directed to gaming systems and methods in which a progressive jackpot is increased, in bulk increases, based upon the occurrence of one or more in-game events.

BRIEF DESCRIPTION

Systems, methods, and articles of manufacture for electronic gaming are disclosed. In a first aspect, a method of electronic gaming using a gaming system is provided. The gaming system includes a display configured to display a wagering game, a player input interface, a credit input mechanism including at least one of a card reader, a ticket reader, a bill acceptor, and a coin input mechanism, the credit input mechanism configured to establish a credit balance that is increasable and decreasable based on wagering activity, a tangible, non-transitory, computer-readable memory, and a game controller communicatively coupled to the memory.

The method includes generating a plurality of reel strips that each include a column of symbol display positions, where each symbol display position includes a symbol, and evaluating each of the symbols in the symbol display positions. The method also includes determining that at least one of the symbols corresponds to a first in-game event, where the first in-game event is associated with a first value, and adding the first value associated with the first in-game event to a first progressive jackpot.

In another aspect, an electronic gaming system is provided. The electronic gaming system includes a display configured to display a wagering game, a player input interface configured to receive a player input, a credit input mechanism including at least one of a card reader, a ticket reader, a bill acceptor, and a coin input mechanism, the credit input mechanism configured to receive a credit wager, the credit wager initiating play of the wagering game, a game controller for controlling the wagering game, and a tangible, non-transitory, computer-readable storage medium having instructions stored thereon.

The game controller executes the instructions stored on the storage medium to perform operations including generating a plurality of reel strips that each include a column of symbol display positions, where each symbol display position includes a symbol, and evaluating each of the symbols in the symbol display positions. The operations also include determining that at least one of the symbols corresponds to a first in-game event, where the first in-game event is associated with a first value, and adding the first value associated with the first in-game event to a first progressive jackpot.

In yet another aspect, an article of manufacture including a non-transitory, tangible, computer readable storage medium having instructions stored thereon that, in response to execution by a game controller configured for electronic gaming, cause the game controller to perform operations including generating a plurality of reel strips that each include a column of symbol display positions that are each positioned adjacent at least one other symbol display position.

The game controller further executes the instructions stored on the storage medium to perform operations including generating a plurality of reel strips that each include a column of symbol display positions, where each symbol display position includes a symbol, and evaluating each of the symbols in the symbol display positions. The operations also include determining that at least one of the symbols corresponds to a first in-game event, where the first in-game event is associated with a first value, and adding the first value associated with the first in-game event to a first progressive jackpot.

BRIEF DESCRIPTION OF THE DRAWINGS

An exemplary embodiment of the subject matter disclosed will now be described with reference to the accompanying drawings.

DETAILED DESCRIPTION

Exemplary embodiments of the present disclosure relate to systems, methods, and articles of manufacture for an electronic game, such as, for example, an electronic game that includes a progressive jackpot. A game or bonus game is facilitated in which a plurality of symbol display positions are selected and evaluated. If the plurality of selected symbol display positions are associated with a designated in-game event, one or more progressive jackpots may be incremented, such as, for example, based upon one or more pay tables associated with the in-game event.

The present disclosure may be implemented in various configurations for gaming machines, including but not limited to: (1) a gaming machine in which the computerized instructions for controlling one or more games are stored within the gaming machine prior to delivery to a gaming establishment; and/or (2) a changeable gaming machine in which the computerized instructions for controlling one or more games are subsequently downloaded to the gaming machine through a data network after the gaming machine is installed within in a gaming establishment.

In an exemplary embodiment, the computerized instructions for controlling one or more games may be executed by a server, such as, for example, a central controller or remote host. In such a "thin client" architecture, the server may remotely control one or more games, or other suitable interfaces, via a gaming network, and the gaming machine may be used to display the games, or suitable interfaces, and to receive inputs or commands from a player.

In another exemplary embodiment, the instructions for controlling one or more games are communicated from a server to a local processor and memory coupled within a gaming machine. In such a "thick client" architecture, a processor of the gaming machine may execute the communicated instructions to control the game or games and/or other suitable interfaces provided to a player.

In another exemplary embodiment, one or more gaming machines within a gaming machine network may utilize a thin client architecture and one or more gaming machines within a gaming machine network may utilize a thick client architecture. Similarly, in various exemplary embodiments, certain functions of a particular gaming machine may be implemented in a thin client architecture and certain other functions of the gaming machine may be implemented in a thick client architecture. For instance, instructions for controlling a game or games may be communicated from a server to one or more network gaming machines operating in a thick client configuration, while instructions for controlling any secondary games or bonus gaming functions may executed by the server in a thin client configuration.

Figure 1:
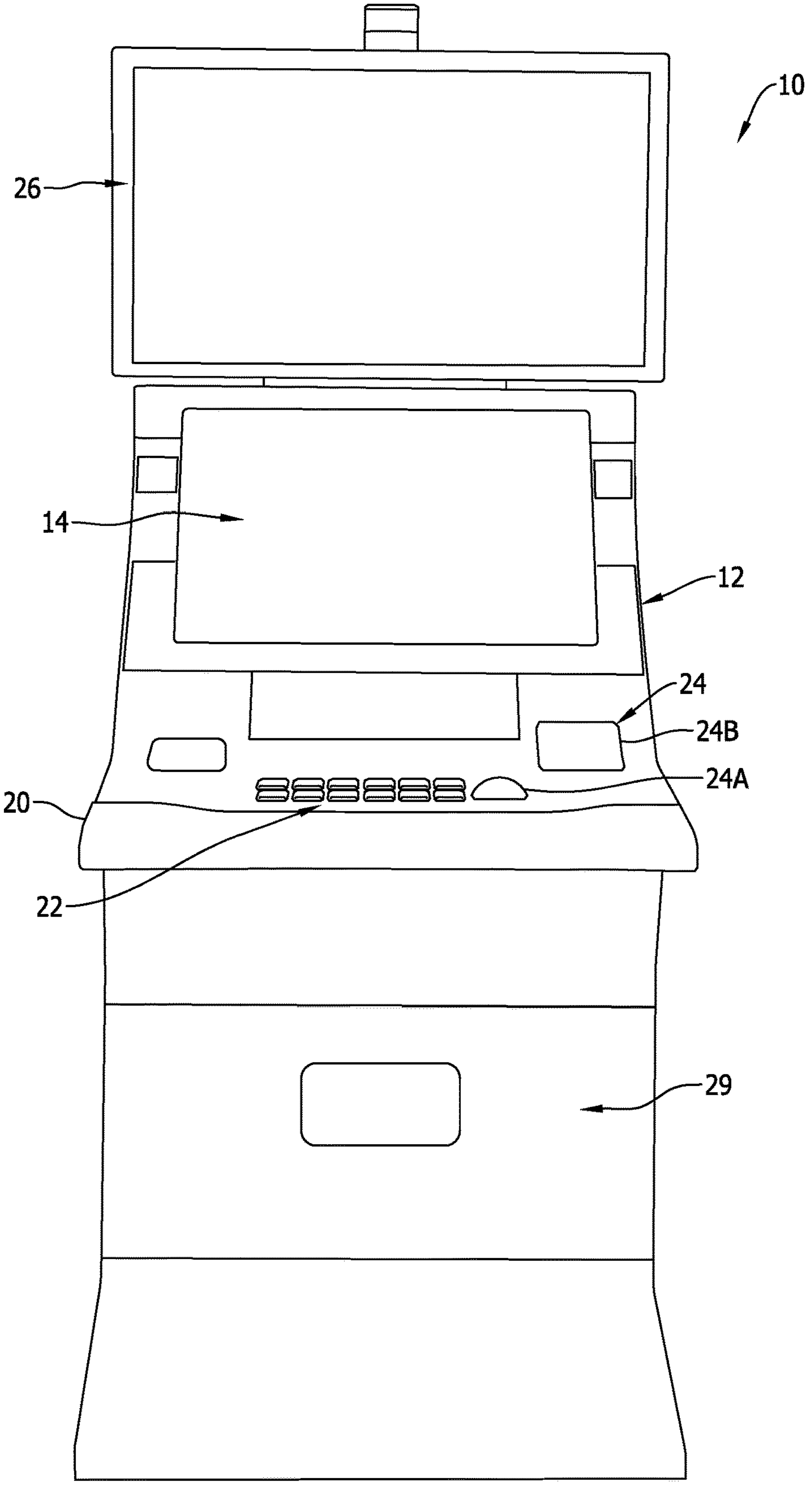
FIG. 1 is a block diagram of exemplary components of a gaming machine.

FIG. 1 is a perspective view of an exemplary gaming machine 10. Gaming machine 10 may include a support structure, housing, console or cabinet 12 that provides support for a plurality of interface units, displays, inputs, controls and other features of a conventional gaming machine. Gaming machine 10 may be configured so that a player can operate it while standing or sitting. Moreover, gaming machine 10 may be positioned on a base or stand, or can be configured as a pub-style table-top game (not shown) that a player can operate while seated. Gaming machine 10 may include varying numbers and styles of cabinets 12, display configurations, and the like without departing from the scope of the present disclosure.

In an exemplary embodiment, gaming machine 10 may include a display 14. Gaming machine 10 may further include a mid-trim 20, which may house a bank of buttons 22 for enabling a player to interact with gaming machine 10 and/or a credit input mechanism 24.

Gaming machine 10 may also include a player marketing module configured to scan or read a player tracking device, such as, for example a loyalty or player tracking card implemented within a casino as part of a loyalty program. The player tracking device may be in the form of a card, flash drive, and/or any other portable storage medium capable of being read by the reading device. In some embodiments, the player marketing module may be configured to transfer credits between gaming machine 10 and the player tracking device.

Gaming machine 10 may further include a top box 26, which may, in turn, include artwork, such as, for example, artwork depicting one or more pay tables, bonus award information, an upper display (not shown), and/or other game information or imagery. Further artwork and/or information may be provided on a front panel 29 of console 12. A coin tray 30 may be mounted beneath front panel 29 for dispensing cash payouts from gaming machine 10.

Display 14 may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In an exemplary embodiment, display 14 includes a touch-screen or touch-sensitive screen. In various embodiments, display 14 may be of any suitable size and configuration, such as any circular, square, rectangular, or other geometric configuration.

Display 14 may be further configured to provide haptic feedback. Top box 26 may also include a display, which may be of the same or different from display 14.

Display 14 may, in various embodiments, display a game and/or accept game play data from a player. Moreover, display 14 may also display information relating to an interactive game, wager triggering event, or wagering outcome. In an exemplary embodiment, an upper display (not shown) mounted in top box 26 may display any wagering outcome, any suitable secondary game associated or not associated with the interactive game, or any information relating to the interactive games. The upper display may also be configured to accept game play data from a player.

Display 14 may, in addition, serve as digital signage operable to advertise one or more games or other aspects of the gaming establishment. In an exemplary embodiment, gaming machine 10 may also include a credit or fund display 20, which may display a player's current number of credits, cash accumulated, account balance, an original number of credits the player funded the gaming machine with, or an equivalent of any of the aforementioned, and the like. Moreover, in an exemplary embodiment, display 14 may display an amount being wagered or a player's accumulated winnings.

In an exemplary embodiment, and as described in greater detail herein, display 14 may display at least one game or game image, game symbol or symbols, and game indicia, such as any visual representation or exhibition of a movement of objects, including, for example, any mechanical, virtual, or video reels and wheels, dynamic lighting, video images, images of people, characters, places, things and faces of cards, and the like. In various embodiments, the symbols, images and indicia described above may be displayed mechanically, such as by one or more mechanical or physical reels. In other words, display 14 may include any electromechanical device, such as one or more rotatable or spinning wheels, reels or dice, any of which may be configured to display at least one or a plurality of games or other suitable images, symbols or indicia.

Figure 2:
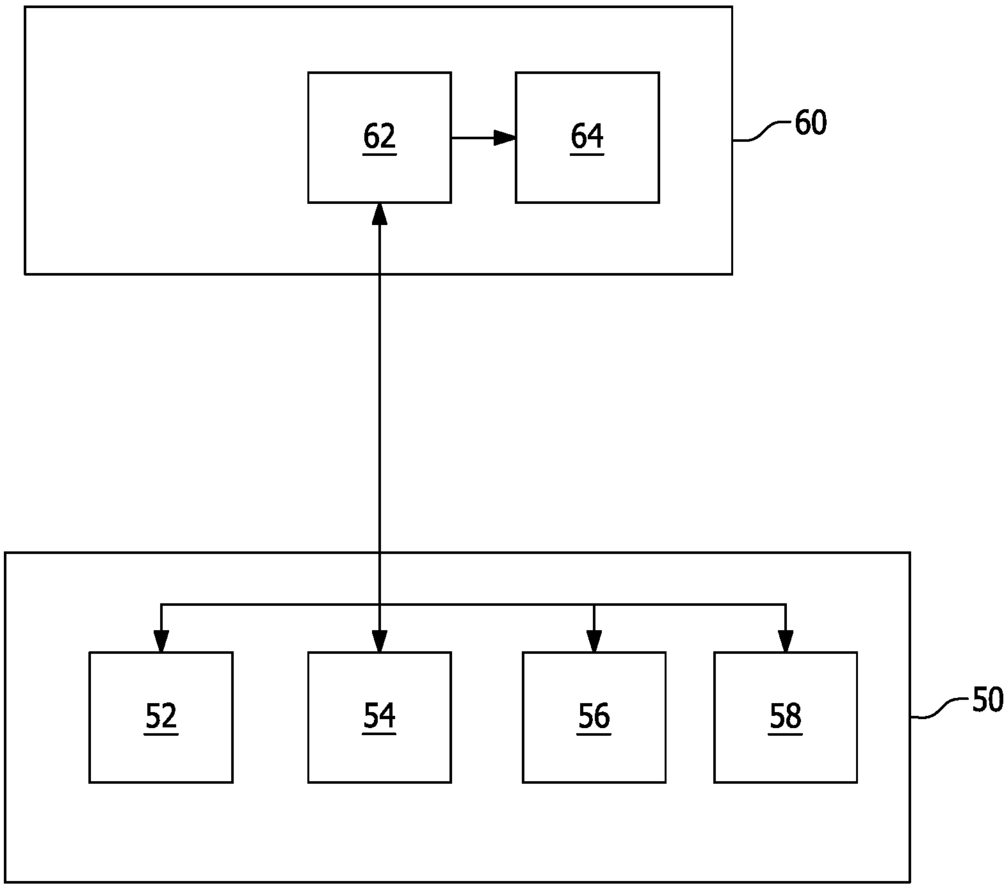
FIG. 2 is a perspective view of an exemplary gaming machine.

FIG. 2 is a block diagram of an exemplary player interface 50 and game controller 60 of gaming machine 10. Player interface 50 and game controller 60 may be housed within gaming machine 10, such as on a printed circuit board located within cabinet 12 of gaming machine 10. As described herein, player interface 50 may be arranged to enable manual interaction between a player and the gaming system and for this purpose includes various input/output components required for the player to enter instructions to play the game and observe the game outcomes.

Components of player interface 50 may include at least one credit input mechanism 24, at least one display 14, a game play mechanism 56 (including one or more input devices that enable a player to input game play instructions or place a wager), and/or one or more audio output devices 58 (e.g., one or more speakers).

Game controller 60 may be in data communication with player interface 50 and may include at least one processor 62 or other suitable controller, such as a microprocessor, a microcontroller-based platform, a suitable integrated circuit or one or more application-specific integrated circuits (ASICs). Processor 62 may be coupled in communication with, or may be operable to access or to exchange signals with, at least one data storage module or memory 64. Processor 62 may thus be configured to retrieve game play instructions from memory 64, process the game play instructions in accordance with game play rules, and output one or more game play outcomes to display 54.

Memory 64 may include any suitable tangible, non-transitory, computer-readable storage medium. Memory 64 may store program code and instructions, executable by processor 62, to control gaming machine 10. Memory 64 may also store other data, such as, for example, image data, one or more pay tables or pay table data, event data, player input data, random or pseudo-random number generators, or numbers generated by a random number of pseudo-random number generator, look-up table data, and/or information and applicable game rules that relate to the play of gaming machine 10.

Figure 3:
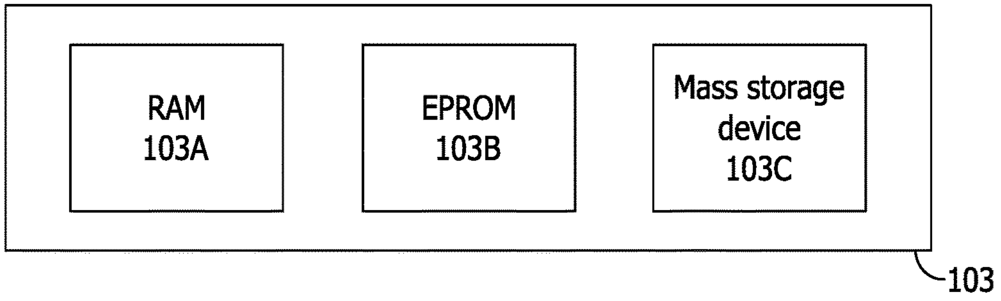
FIG. 3 is a block diagram of exemplary components of a gaming machine.

With brief attention to FIG. 3, a block diagram of memory 64 is shown. Memory 64 may, in various embodiments, include a memory 103 (as described herein with reference to FIG. 3). Memory 103 may include random access memory (RAM) 103A, such as non-volatile RAM (NVRAM), magnetic RAM (MRAM), ferroelectric RAM (FeRAM) and other forms as commonly understood in the gaming industry. Memory 103 may further include read only memory (ROM), such as EPROM 103B or electrically erasable programmable read only memory (EEPROM). Memory 64 may further include one or more mass storage devices 103C, such as one or more hard drives, one or more solid state or flash memory components, one or more CD and/or DVD drives, and the like. Any other suitable magnetic, optical, and/or semiconductor memory may be used to operate in conjunction with gaming machine 10 that enables gaming machine 10 to function as described herein.

In an exemplary embodiment, RAM 103A may temporarily store one or more program files (and/or other related data) for execution by processor 62. EPROM 103B may include a boot ROM device and/or may contain some system or game related code. Mass storage device 103C may store one or more game programs, the integrity of which may be verified and/or authenticated by the processor 62 through the use of protected or encrypted code stored, for example, on EPROM 103B.

In various embodiments, part or all of the program code and/or operating data described above is stored in a detachable or removable memory, including, but not limited to, a suitable cartridge, disk, CD ROM, DVD or USB memory device. In addition, in various embodiments, all or part of the program code and/or operating data described above may be downloadable to memory 64 by way of any suitable computer network.

In an exemplary embodiment, a desktop computer, a laptop personal computer, a personal digital assistant (PDA), a smartphone, a tablet computing device or other portable computing device, and/or any other computerized platform may implement the computing operations of the present disclosure. For example, any suitable mobile computing device, such as any smartphone or tablet computing device, may implement and enable gameplay as described herein. It should be appreciated that each gaming machine 10 disclosed herein may include a device that has obtained approval from a regulatory gaming commission or a device that has not obtained approval from a regulatory gaming commission. It should also be appreciated that processor 62 and memory 64 may be collectively referred to herein as a “computer” or “controller.”

Returning to FIG. 1, in an exemplary embodiment, credit input mechanism 24 may be coupled in communication with processor 62. Credit input mechanism 24 may include any suitable credit input mechanism or device, such as a coin input chute 24A, a bill or ticket collector 24B, and the like. Credit input mechanism may be configured to receive any suitable monetary credit, such as money, coins, tokens, tickets, and the like. In various embodiments, credit input mechanism 24 may further include card reader devices, such as credit or debit card readers or validators for credit cards, debit cards, printed ticket printers and/or readers, and the like.

In various embodiments, a player may insert an identification card (not shown) into a card reader of gaming machine 10. The identification card may be a smart card that includes a programmed microchip or a magnetic strip coded with a player's identification, credit totals (or related data) and other relevant information. A player may further carry a portable device, such as a cell phone or smart phone, a radio frequency identification tag or any other suitable wireless communication device, which communicates a player's identification, credit totals (or related data) and other relevant information to gaming machine 10. In an embodiment, money may be transferred to gaming machine 10 via an electronic funds transfer process. When a player funds gaming machine 10, processor 62 may determine an amount of funds entered and display the corresponding amount on the display 14.

Game play mechanism 56 may include at least one input device that is coupled in communication with processor 62. An input device may include any device that enables a player to produce an input signal that is receivable by processor 62. For example, in one embodiment, after funding gaming machine 10, the input device may include a game activation device, such as a pull arm or one or more play button 22 that enables the player to start the game or a sequence of events in gaming machine 10. Play button 22 may include any suitable play activator such as a bet one button, a max bet button, or a repeat the bet button. In an embodiment, after appropriate funding of gaming machine 10, game play may begin automatically.

In an exemplary embodiment, one input device may include a "Bet One" button. A player may place a wager or bet by pushing the Bet One button and may increase the wager by repeatedly depressing or selecting the Bet One button. In various embodiments, an input device includes a "Bet Max" button that enables a player to place a maximum wager permitted during a particular game or game session.

In various embodiments, an input device may also include a "Cash Out" button. A player may depress or select a Cash Out button to receive a cash payment or other suitable form of payment corresponding to the number of credits remaining. In an embodiment, when the player cashes out, the player receives coins or tokens in a coin payout tray. A player may further receive tickets or credit slips, or the player's electronically recordable identification card may be funded, in response to selection of a Cash Out button.

In various embodiments, an input device may include a touch-screen that is coupled to a touch-screen controller, or some other touch-sensitive display overlay, to enable player interaction with images presented on display 14. A touch-screen and/or touch-screen controller may be communicatively coupled to a video controller, such that a player may provide input signals to gaming machine 10 by physically manipulating or interacting with the touch-screen.

Gaming machine 10 may include a sensor, such as a camera (not shown) coupled in communication with processor 62. The camera may, in various embodiments, be controlled by processor 62, such that a player may direct the orientation and focus of the camera to acquire an image of a player actively playing gaming machine 10 and/or a surrounding area of gaming machine 10. In an exemplary embodiment, the camera may selectively acquire still or moving (e.g., video) images and may be configured to acquire the images in either an analog, digital, or other suitable format. Display 14 may be configured to display the image acquired by the camera, as well as to display the visible manifestation of the game in split screen or picture-in-picture fashion. For example, the camera may acquire an image of the player and processor 62 may incorporate that image into the interactive and/or secondary game as a game image, symbol or indicia.

Figure 4:
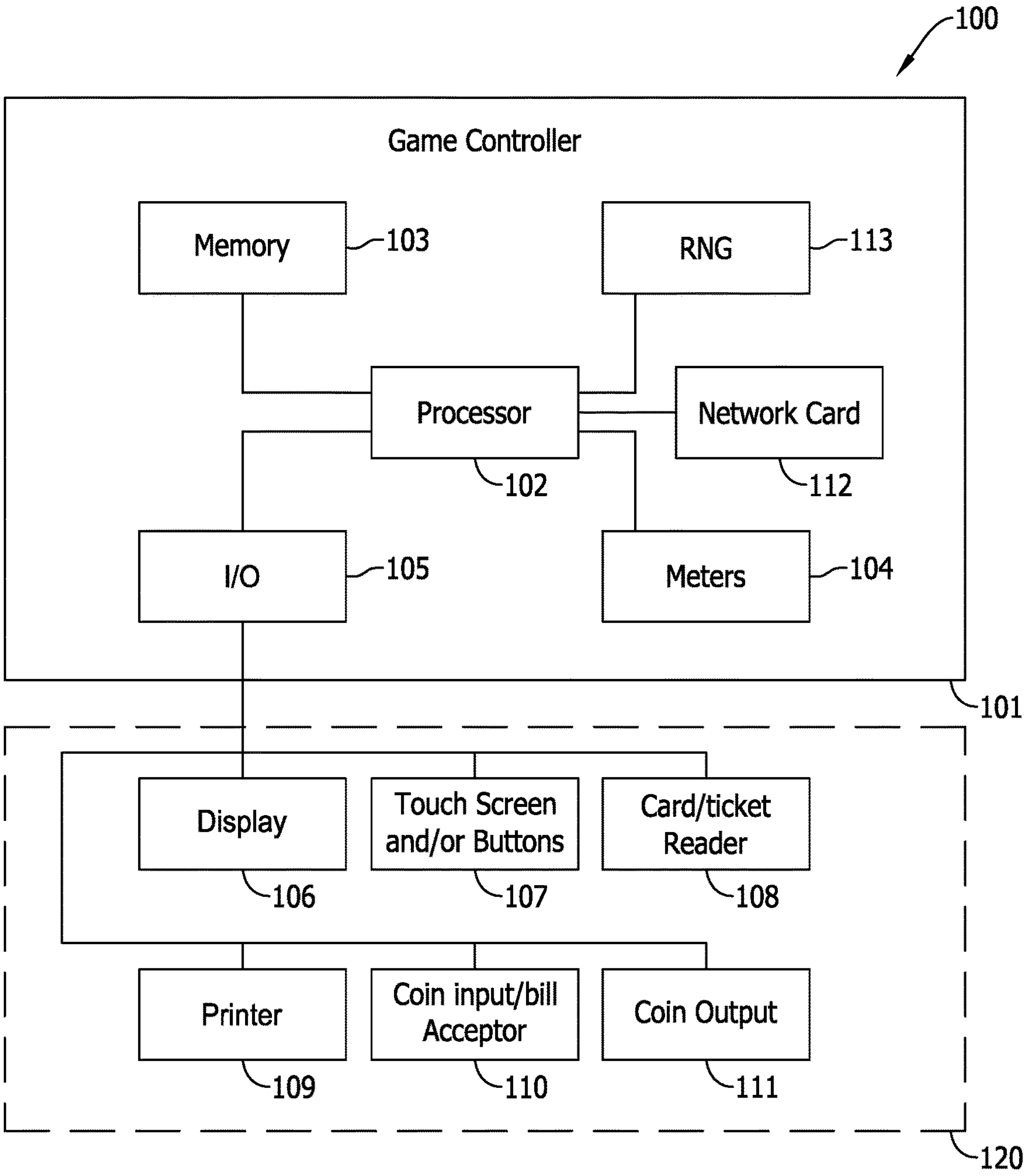
FIG. 4 is a schematic diagram of exemplary components of a memory.

FIG. 4 illustrates a more detailed block diagram of various exemplary functional components of a gaming machine 100, which may be the same as or different from gaming machine 10 (as shown in FIG. 2). The foregoing description of components (e.g., display 14, player interface 50, and game controller 60) may therefore apply to the description of similar components in gaming machine 100. For instance, processor 62 may be the same as or different from 102, as described below. Similarly, memory 64 may be the same as or different from memory 103 as described below.

Accordingly, gaming machine 100 may include a game controller 101 (which may include a processor 102 mounted on a circuit board, as described in greater detail above). Instructions and data to control operation of processor 102 may be stored in a memory 103 that is in data communication with processor 102. Gaming machine 100 may include both volatile and non-volatile memory and more than one of each type of memory, with such memories being collectively represented by memory 103.

Gaming machine 100 may further include hardware meters 104 (to ensure regulatory compliance and to monitor player credit) and/or an input/output (I/O) interface 105 (for communicating with peripheral devices of gaming machine 100). Input/output interface 105 and/or the peripheral devices may include intelligent devices with their own memory for storing associated instructions and data. A random number generator module 113 may generate random numbers for use by processor 102. Persons skilled in the art will appreciate that random number generator module 113 includes a pseudo-random number generator.

In an exemplary embodiment, a player interface 120 includes peripheral devices that communicate with game controller 101 including one or more displays 106, a touch screen and/or input buttons 107 (which provide a game play mechanism), and a credit input mechanism, such as a card and/or ticket reader 108, a printer 109, a bill acceptor and/or coin input mechanism 110, and a coin output mechanism 111. The credit input mechanism is configured to receive a credit wager to initiate play of a base game, and establish a credit balance (e.g., using the received credit wager) that is increasable and decreasable based on wagering activity within a game. Player interface 120 also includes a payout mechanism such as a printer 109 and/or a coin output mechanism 111. The payout mechanism is configured to output a payout to a player of gaming machine 100 based on an outcome of the game (e.g., a base game and/or a feature game).

Additional hardware may be included as part of gaming machine 100, or hardware may be omitted as required for the specific implementation. For example, although buttons or touch screens are typically used in gaming machines to allow a player to place a wager and to initiate a play of a game any input device that enables the player to input game play instructions may be used. For example, in some gaming machines a mechanical handle may be used to initiate a play of the game. Persons skilled in the art will also appreciate that a touch screen can be used to emulate other input devices, such as, for example, a touch screen that can display virtual buttons that a player can "press" by touching the screen where they are displayed.

In addition, gaming machine 100 may include a communications interface, such as, for example a network card 112. Network card 112 may, for example, send status information, accounting information and/or other information to a bonus controller, central controller, server or database and receive data or commands from the bonus controller, central controller, an/or server or database. In various embodiments (e.g., embodiments that employ a player marketing module), communications over a network may be via the player marketing module—e.g., the player marketing module may be in data communication with one or more of the above devices.

In various embodiments, components of gaming machine 100 may be distributed. For example, in an embodiment, input/output devices 106, 107, 108, 109, 110, and 111 may be provided remotely from game controller 101.

Figure 5:
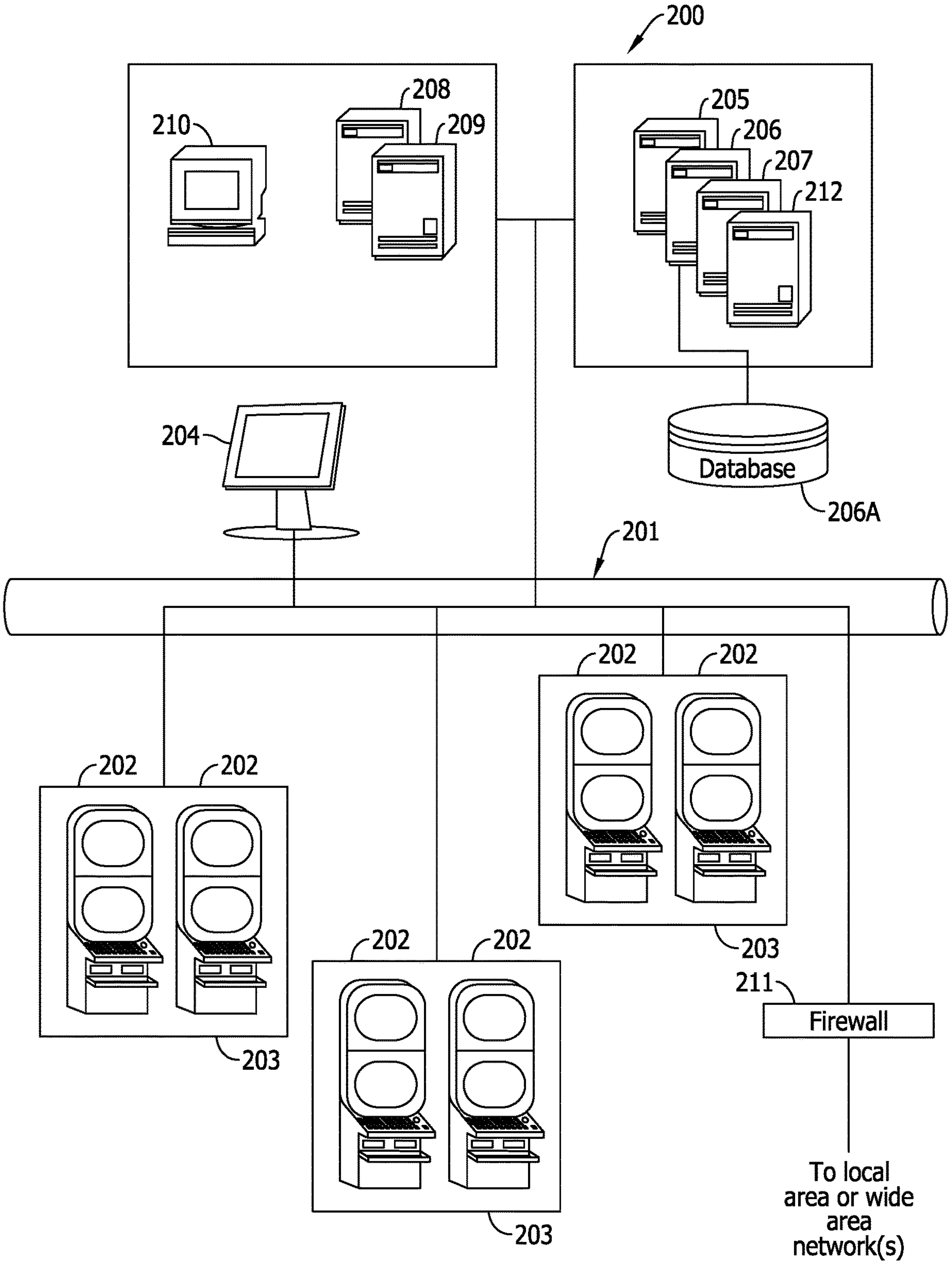
FIG. 5 is a schematic diagram of an exemplary network gaming system.

FIG. 5 illustrates such an exemplary distributed gaming system 200. Gaming system 200 may include a network 201, which, for example, may include a wired or wireless network, such as a Wi-Fi or BLUETOOTH network, an Ethernet network, an RS-232 network, and/or any combination thereof. In an exemplary embodiment, gaming machines 202, shown arranged in three banks 203 of two gaming machines 202, are connected to network 201. Gaming machines 202 may provide a player operable interface and may be the same as (or substantially similar to) the gaming machines 10 and 100 (as shown in FIGS. 2 and 3), or may have simplified functionality depending, for example, on various game play requirements.

One or more displays 204 may also be connected to network 201. For example, displays 204 may be associated with one or more banks 203 of gaming machines. Displays 204 may be used to display representations associated with game play on gaming machines 202 and/or used to display other representations, such as, for example promotional or informational material. Displays 204 may be the same as or substantially similar to display 14, as described above.

In a thick client embodiment, game server 205 may implement part of the game played by a player using gaming machine 202, and gaming machine 202 may implement part of the game. In such an embodiment, insofar as both game server 205 and gaming machine 202 may implement part of the game, they may collectively include a game controller. A database management server 206 may manage storage of game programs and associated data for downloading or access by gaming machines 202 in a database 206A. Typically, if gaming system 200 enables players to participate in a jackpot game, a jackpot server 207 may be provided to perform accounting functions for the jackpot game. A loyalty program server 212 may also be provided.

In a thin client embodiment, game server 205 may implement most or all of the game played by a player using gaming machine 202, and gaming machine 202 may, in essence, function provide little more than the player interface. In such an embodiment, game server 205 may include the game controller. Gaming machine 202 may thus receive player instructions and transmit those instructions to game server 205. Further, in a thin client embodiment, gaming machines 202 may be computer terminals, such as, for example, personal computers, laptop computers, tablet computing devices, smartphones, and the like running software that provides a player interface. Other client/server configurations are contemplated and are within the scope of this disclosure. Additional details of a client/server architecture may be found in WO 2006/052213 and PCT/SE2006/000559, the disclosures of which are incorporated herein by reference in their entireties.

One or more servers may be provided to assist in the administration of gaming system 200. Such servers may include, for example, a gaming floor management server 208, and a licensing server 209 to monitor the use of licenses relating to particular games. An administrator terminal 210 may be provided to allow an administrator to run network 201 and the devices connected to network 201.

Gaming system 200 may communicate with other gaming systems and/or other local networks, such as, for example a corporate network, and/or a wide area network such as the Internet Communications may be filtered through a firewall 211.

Persons skilled in the art will appreciate that in accordance with known techniques, functionality at the server side of network 201 may be distributed over a plurality of different computers. For example, elements may be run as a single "engine" on one server or a separate server may be provided. For example, game server 205 may implement a random number generator engine. Alternatively, a separate random number generator server may be provided. Further, persons skilled in the art will appreciate that a plurality of game servers may be provided to implement different games or a single game server may implement a plurality of different games as required by the terminals.

In an exemplary embodiment, a player may place a wager using the game play mechanism 56. A game (or game session) may be initiated in response to placement of the wager, a plurality of symbols randomly drawn, and a game (or game session) outcome determined based upon the symbols drawn. A game outcome may be compared to a pay table (which may be stored in a computer memory) to determine a payout or award (also referred to herein as a win entitlement). Persons skilled in the art will appreciate that a player's wager can be varied from game to game dependent on player selections.

In various embodiments, a wager may include a selection of a number of lines to be played during a game session. Such lines may include an interconnected combination of symbol display positions. Each selected line may be evaluated to identify winning combinations of symbols. A pay table (e.g., a pay table stored in memory 64) may be referenced to identify a payout or award based upon an identified winning combination of symbols. In various embodiments, an award may be multiplied or increased by a multiplication factor as well.

In an exemplary embodiment, gaming machine 202 may generate an award that is not based solely upon a number of a lines selected. For example, "scatter" pays (e.g., randomly selected awards that are not identified based upon a plurality of adjacent symbols) may be awarded independently of a player's selection of pay lines.

Throughout this specification and in the claims, the terms "primary game" and "bonus game" refer to a game session that includes more than one game event or, simply, one or more games. The primary game may correspond to a primary or "base" game, as opposed to a bonus game, as described below. The primary game may be initiated in response to a wager or credit being received by or transferred to gaming machine 10 (shown in FIG. 1). The primary game (as well as one or more games comprising the primary game) may also be initiated by other game events including, for example, a player selecting a "spin" button, a start button, a deal button, or any other such input selector designated for initiating a game session. The primary game may be terminated voluntarily in response to an input by the player indicating that the player wishes to stop the game or automatically by the gaming device in response to a termination event, such as a zero credit balance in the reel game.

Further, as used herein, the terms "bonus game," "secondary game," and "bonus game session" refer generally to a game or a component of a game involving procedures in addition to the primary game. The bonus game may be initiated after, or during, the primary game and in response to a particular condition occurring during the primary game. The bonus game may include a plurality of bonus game events. For example, where the primary game includes a slot machine game, the bonus game may allow players a possibility of winning more than the pay table for the primary game indicates. Typically, a bonus game outcome may depend upon a particular symbol being displayed when one of a plurality of final game events takes place. In addition, the bonus game outcome may depend upon winning a payout while gaming machine 10 is in a bonus mode or "zone." In various embodiments, the outcome of the bonus game may be unrelated to the outcome of the primary game.

As used herein, the term "reel strip" may be used to refer to a column of symbol display positions. Each symbol display position may be displayed or located on a physical reel or a virtual reel. In the exemplary embodiment, gaming machine 10 may display six reel strips, each having six symbol display positions, for a total of thirty six symbol display positions. A symbol display position may further display a symbol, such as a symbol selected by game controller 60.

In an exemplary embodiment, a jackpot award may include a progressive jackpot award. As used herein, a progressive jackpot award may include a shared jackpot award that is generated from a plurality of networked gaming machines, such as the networked gaming machines 202 described above. Further, in various embodiments, the gaming machines 202 contributing to a progressive jackpot award may include different primary and/or secondary games. For example, in an exemplary embodiment, a first networked gaming machine may enable a first primary and/or secondary game, while a second networked gaming machine may enable a second primary and/or secondary game.

Figure 6:
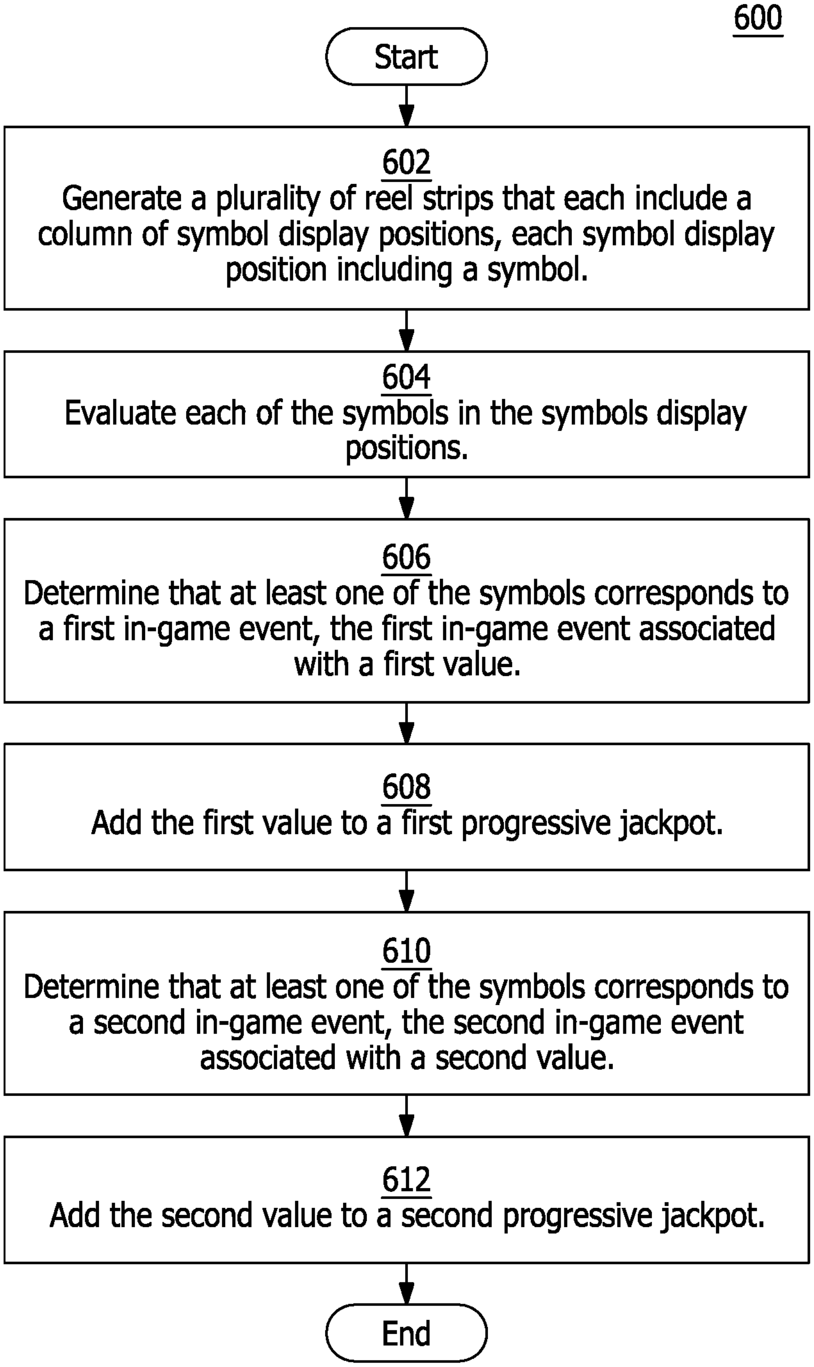
FIG. 6 is a flowchart of an exemplary method of electronic gaming.

With reference to FIG. 6, an exemplary process 600 for electronic gaming is shown, in which a plurality of symbols are evaluated to determine whether one or more in-game events have occurred. FIGS. 7-10 show screenshots of a networked gaming machine 202 implementing process 600.

Accordingly, as used herein, an "in-game event" is any event that occurs within a base game and/or a bonus game. For example, an in-game even may correspond to the occurrence of a single symbol in a base game and/or a bonus game. Similarly, an in-game event may correspond to the occurrence of a plurality of symbols, such as a winning combination of symbols, in a base game and/or bonus game. In some embodiments, an in-game event is a combination of in-game events, such as, for example, a combination of winning combinations occurring within a base game and/or bonus game. In addition, in some embodiments, an in-game event may correspond to any other pay combination, any feature, any particular display configuration, and/or any bonus or jackpot contribution occurring within a base game and/or bonus game. Thus, an in-game event may comprise any suitable event occurring within a base game and/or bonus game that may be linked, in some way, to a progressive jackpot.

Although two in-game events are described below, it will be apparent to those of ordinary skill that any number of in-game events may be implemented in accordance with this disclosure. In addition, although each in-game event is described in conjunction with a respective progressive jackpot, those of ordinary skill will appreciate that each in-game event may contribute to a single jackpot, or, in the alternative, that various associations between one or more in-game events and one or more progressive jackpots may be made. For example, a first in-game event may contribute to a second progressive jackpot, and a second in-game event may contribute to a first progressive jackpot.

Figure 7:
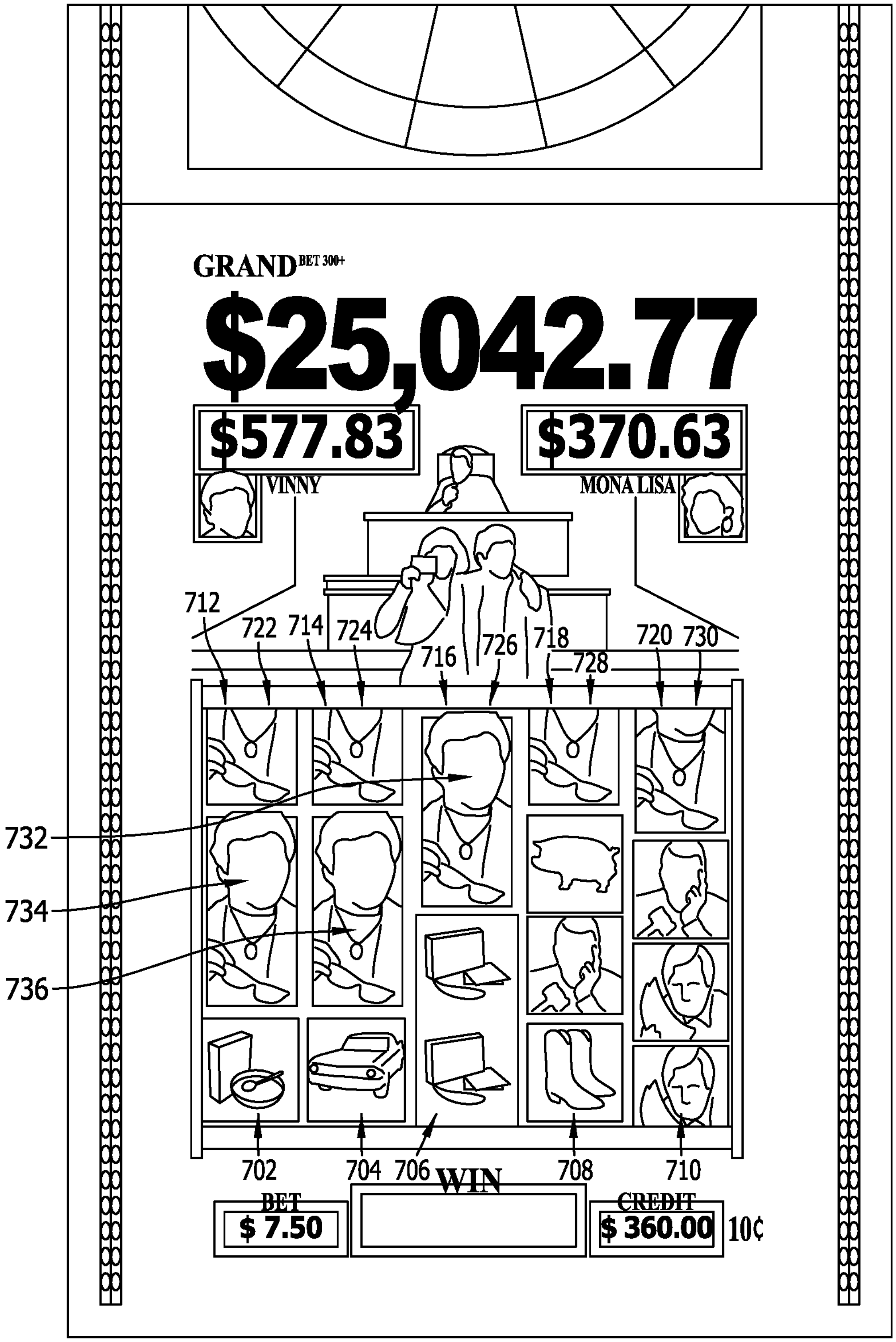
FIG. 7 is an exemplary screenshot that may be displayed in which an in-game event occurs.

With particular attention to the screenshot shown at FIG. 7, in the exemplary embodiment, controller 60 may generate 602 a plurality of reel strips, such as reel strips 702, 704, 706, 708, and 710, for presentation on display 14. Each reel strip 702-710 may include a column of symbol display positions 712, 714, 716, 718, and 720, and each symbol display position 712-720 may include a symbol 722, 724, 726, 728, and 730, as described above. Reel strips 702-710 may, in addition, be generated in response to a wager or bet placed by a player, such that reel strips 702-710 are made, by controller 60, to spin, and such that symbols 722-730 selected by controller 60 for presentation in each of symbol display positions 712-720 are displayed on display 14.

Controller 60 may evaluate 604 each of symbols 722-730 selected for display in each of symbol display positions 712-720 to determine 606 whether at least one of symbols 722-730 corresponds to an in-game event. For example, controller 60 may determine that a particular symbol corresponds to a first in-game event. The first in-game event may be, for instance, that a particular symbol, such as a symbol associated with a particular theme, has been selected for presentation. Similarly, the first in-game event may be that a particular sequence of symbols, or a particular number of identical symbols, have been selected for presentation.

In the exemplary embodiment, the first in-game event may correspond to selection by controller 60 of one or more symbols that are associated with a first theme, such as a first theme from the film "My Cousin Vinny." This first theme may be, for example, a theme associated with the "Vinny" character from the film. In some embodiments, the first in-game event corresponds to selection by controller 60 of at least one "Vinny" symbol. For example, three symbols 732, 734, and 736 associated with the "Vinny" character may be selected by controller 60 and displayed on display 14.

Figure 8:
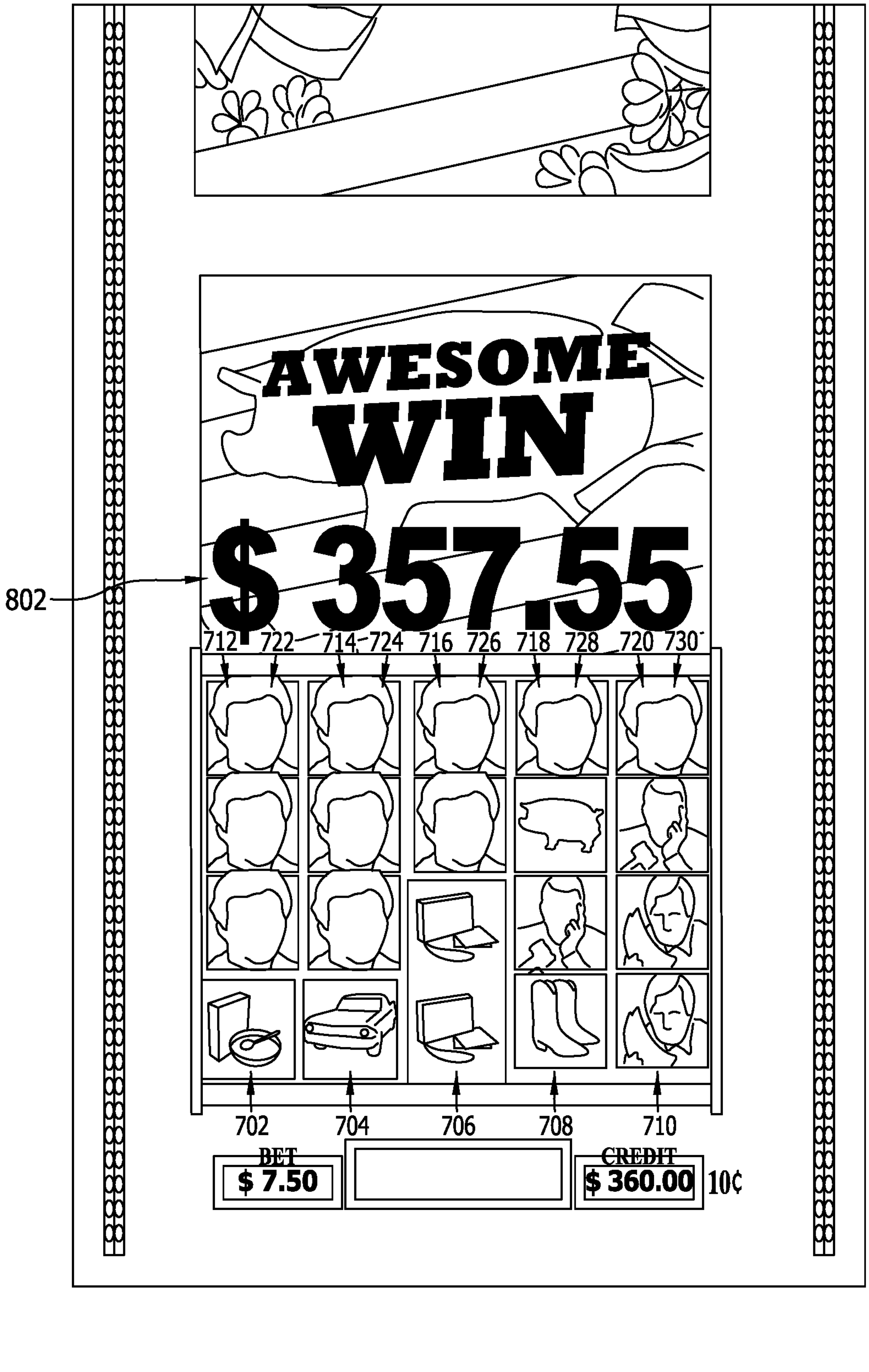
FIG. 8 is an exemplary screenshot that may be displayed in which the in-game event shown at FIG. 7 triggers a bulk increment of a first progressive jackpot.

Whatever the specific details of the first in-game event, and with attention now to FIG. 8, the first in-game event may be associated with a first value, such as a first monetary value and/or a first credit value. For example, a first value 802 may be associated with a first in-game which, which may correspond, as described above, to selection by controller 60 of three Vinny symbols 732, 734, and 736. First value 802 may correspond to an award provided to the player in the base game and/or bonus game within which the first in-game event has occurred. Accordingly, controller 60 may provide first value 802 to the player as an award in the base game and/or bonus game.

Figure 9:
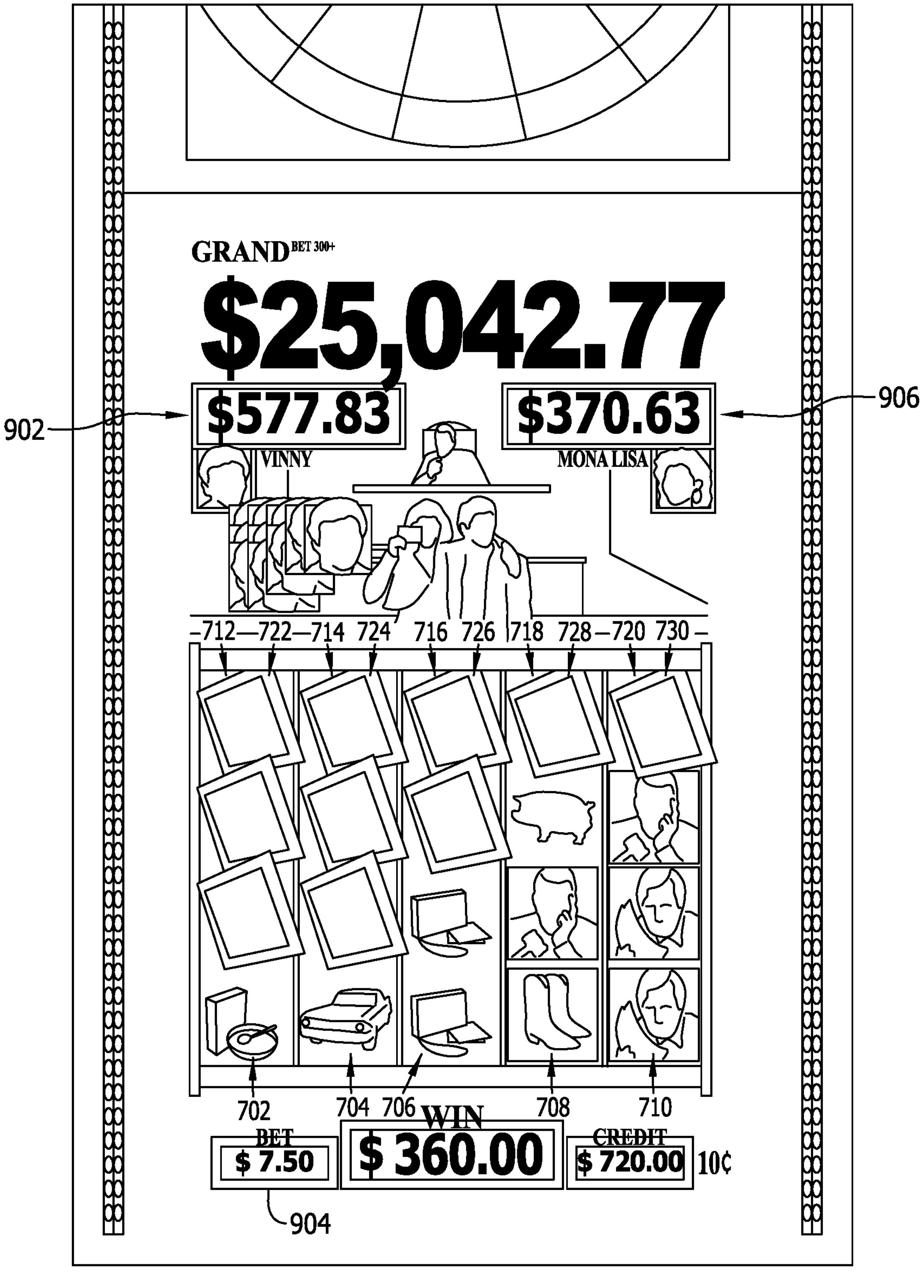
FIG. 9 is another exemplary screenshot that may be displayed in which the in game event shown at FIG. 7 triggers a bulk increment of a first progressive jackpot.
Figure 10:
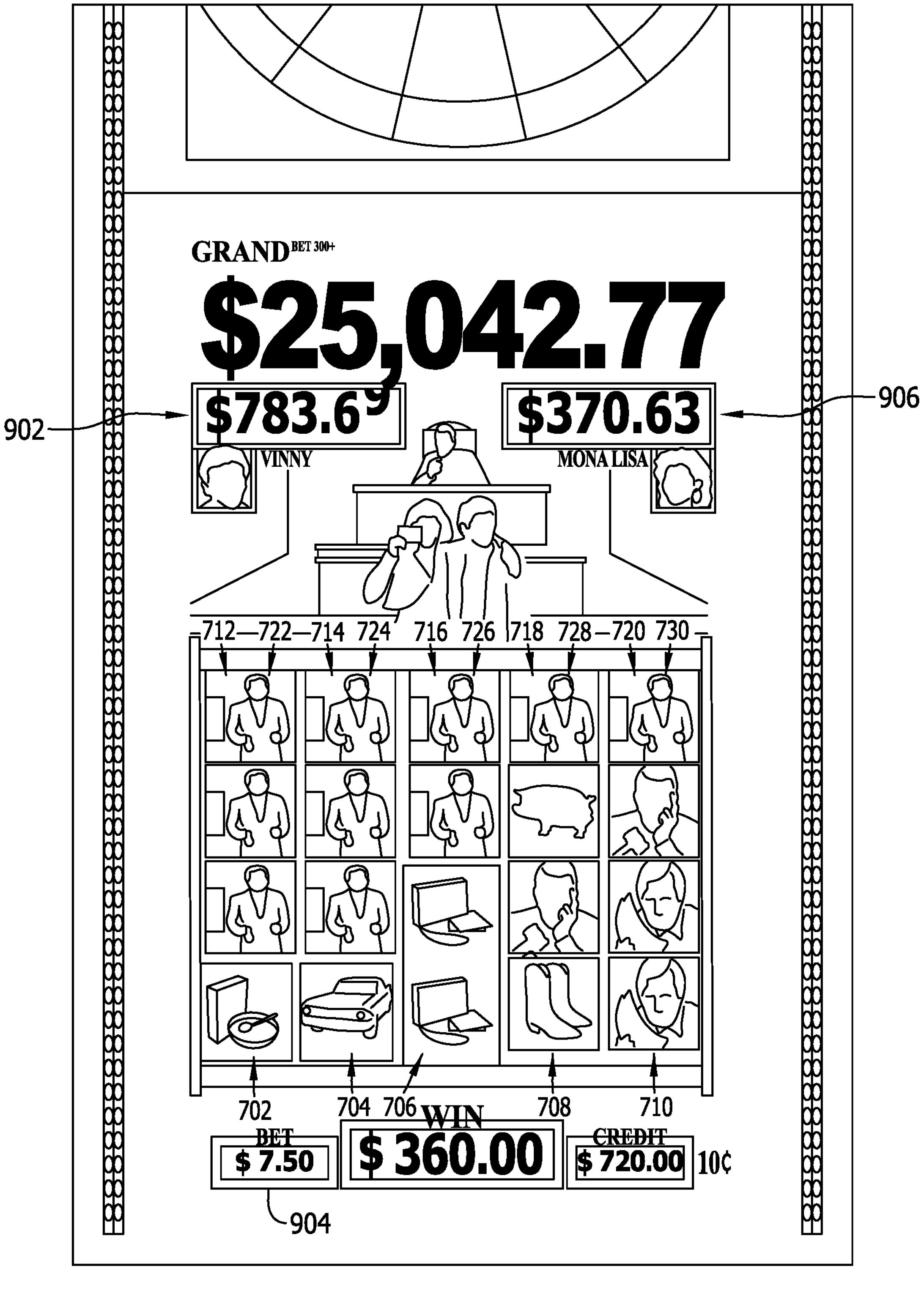
FIG. 10 is an exemplary screenshot that may be displayed in which the first progressive jackpot is incremented based on the in-game event shown at FIG. 7.

As shown with reference to FIGS. 9 and 10, controller 60 may also add 608 first value 802 to a first progressive jackpot 902, which, as described above, may be linked to a plurality of gaming machines (e.g., gaming machines 202). First progressive jackpot 902 may, like the first in-game event, be associated with a first theme, such as a theme from the film "My Cousin Vinny." In the exemplary embodiment, first progressive jackpot 902 is associated with the "Vinny" character from the film. Thus, controller 60 may add entire first value 802 to first progressive jackpot 902 as a bulk increment to first progressive jackpot 902 as a result of the first in-game event. In some embodiments, controller 60 may add a portion or percentage of first value 802 to first progressive jackpot 902 as a result of the first in-game event. In other embodiments, controller 60 may multiply first value 802 by a multiplication factor, as described elsewhere herein, and the product of the multiplication may be added to first progressive jackpot 902. In each instance, however, first progressive jackpot 902 may appear to leap or jump each time a player receives a symbol or symbol combination associated with the first in-game event.

In addition, and in some embodiments, controller 60 may add all or a portion of a total bet value 904 placed by the player as a wager to first progressive jackpot 902. This may be done in conjunction with the addition of first value 802 to first progressive jackpot 902, such that first progressive jackpot 902 is incremented slowly, as a result of each player's respective total bet value 904, and more rapidly, in bulk increments, each time the first in-game event occurs.

In addition to the first in-game event, controller 60 may determine 610 that at least one of symbols 722-730 selected for presentation corresponds to a second in-game event. The operations described above in connection with the first in-game event may be applied, in the same way, to the second in-game event. For example, like the first in-game event, the second in-game event may correspond to a particular symbol, such as a symbol associated with a particular theme, and/or a particular sequence of symbols, or a particular number of identical symbols. In the exemplary embodiment, the second in-game event may correspond to selection by controller 60 of one or more symbols that are associated with a second theme, such as a second theme from the film "My Cousin Vinny." This second theme may be, for example, a theme associated with the "Mona Lisa" character from the film. In some embodiments, the second in-game event corresponds to selection by controller 60 of at least one "Mona Lisa" symbol (not shown).

The second in-game event may be associated with a second value (not shown), such as a second monetary value and/or a second credit value, either of which may correspond to an award provided to the player in the base game and/or bonus game within which the second in-game event has occurred. Accordingly, controller 60 may provide the second value to the player as an award in the base game and/or bonus game.

Controller 60 may also add 612 the second value to a second progressive jackpot 906, which, as described above, may be linked to a plurality of gaming machines (e.g., gaming machines 202). Second progressive jackpot 906 may, like the second in-game event, be associated with a second theme, such as a theme from the film "My Cousin Vinny." In the exemplary embodiment, second progressive jackpot 906 is associated with the "Mona Lisa" character from the film. Thus, controller 60 may add the entire second value to second progressive jackpot 906 as a bulk increment to second progressive jackpot 906 as a result of the second in-game event. In some embodiments, controller 60 may add a portion or percentage of the second value to second progressive jackpot 906 as a result of the second in-game event. In other embodiments, controller 60 may multiply the second value by a multiplication factor, as described elsewhere herein, and the product of the multiplication may be added to second progressive jackpot 906. In each instance, however, second progressive jackpot 906 may appear to leap or jump each time a player receives a symbol or symbol combination associated with the second in-game event.

In addition, and in some embodiments, controller 60 may add all or a portion of a total bet value 904 placed by the player as a wager to second progressive jackpot 906. This may be done in conjunction with the addition of the second value to second progressive jackpot 906, such that second progressive jackpot 906 is incremented slowly, as a result of each player's respective total bet value 904, and more rapidly, in bulk increments, each time the second in-game event occurs.

In the exemplary embodiment, the first in-game event and the second in-game event may be associated with a base game or bonus game paytable (Table 1). In addition, the first-in game event may be associated with a first jackpot contribution paytable (Table 1), and the second in-game event may be associated with a second jackpot contribution paytable (Table 3). Exemplary paytables are shown below. However, these paytables are intended for purposes of illustration, and other paytables are contemplated by and within the scope of the present disclosure. In-game events are denoted by the letters "IGE" in the tables below.

TABLE 1

| SYMBOLS | 5 of a Kind | 4 of a Kind | 3 of a Kind | 2 of a Kind |
|---|---|---|---|---|
| First IGE | 200 | 150 | 75 | 20 |
| Second IGE | 150 | 75 | 25 | 10 |

TABLE 2

| SYMBOLS | 5 of a Kind | 4 of a Kind | 3 of a Kind | 2 of a Kind |
|---|---|---|---|---|
| First IGE | 200 | 150 | 75 | 20 |
| Second IGE | 0 | 0 | 0 | 0 |

TABLE 3

| SYMBOLS | 5 of a Kind | 4 of a Kind | 3 of a Kind | 2 of a Kind |
|---|---|---|---|---|
| First IGE | 0 | 0 | 0 | 0 |
| Second IGE | 150 | 75 | 25 | 10 |

As shown above at Table 1, during a base game or bonus game, a first in-game event may correspond to five symbols of a particular kind (e.g., five "Vinny" symbols), four symbols of a particular kind, three symbols of a particular kind, or two symbols of a particular kind. Similarly, a second in-game event may correspond to five symbols of a particular kind (e.g., five "Mona Lisa" symbols), four symbols of a particular kind, three symbols of a particular kind, or two symbols of a particular kind. Each symbol combination may be associated with a particular value. For instance, five symbols received as part of a first in-game event may be associated with a value of two-hundred. Similarly, five symbols received as part of a second in-game event may be associated with a second value of one-hundred-and-fifty. These values may be awarded to a player as a result of the base game or bonus game.

In addition, as shown at Table 2, the value associated with the first in-game event may be contributed or added to first progressive jackpot 902. For example, where the first in-game event is associated with a value of two-hundred, the same value may be added to first progressive jackpot 902. In various embodiments, and as described above, the value associated with the first in-game event may be multiplied by one or more multiplication factors, such as a bet multiplier and/or a number of ways to win, prior to addition to first progressive jackpot 902.

Similarly, as shown at Table 3, the value associated with the second in-game event may be contributed or added to second progressive jackpot 906. For example, where the second in-game event is associated with a value of one-hundred-and-fifty, the same value may be added to second progressive jackpot 906. In various embodiments, and as described above, the value associated with the second in-game event may be multiplied by one or more multiplication factors, such as a bet multiplier and/or a number of ways to win, prior to addition to second progressive jackpot 906.

Embodiments of the gaming machines and systems, as described above, facilitate evaluation of a plurality of symbols during a base game and/or during a bonus game to determine whether any of the symbols presented during the game correspond to a particular in-game event. Each in-game event may be associated with a particular value, which may be added, in total, in part, or after multiplication by a multiplication factor, to a particular progressive jackpot. The gaming machines and systems described above therefore facilitate an electronic game in which a value associated with a progressive jackpot surges dramatically, in bulk increases, corresponding to one or more values associated with each in-game event and in association with awards provided to players as a result of each in-game event. Hence, the gaming machines and systems described herein facilitate a new and exciting type of progressive jackpot game in which one or more progressive jackpots are incremented in bulk increments based upon one or more in-game events.

As indicated above, the method may be embodied in program code. The program code could be supplied in a number of ways, for example on a tangible computer readable storage medium, such as a disc or a memory device, e.g. an EEPROM, (for example, that could replace part of memory 103) or as a data signal (for example, by transmitting it from a server). Further different parts of the program code can be executed by different devices, for example in a client server relationship. Persons skilled in the art, will appreciate that program code provides a series of instructions executable by the processor.

Exemplary embodiments of a system, method, and article of manufacture for electronic gaming and related components are described above in detail. The disclosure is not limited to the specific embodiments described herein, but rather, components of the systems and/or articles and/or steps of the methods may be utilized independently and separately from other components and/or steps described herein. For example, the configuration of components described herein may also be used in combination with other processes, and is not limited to practice with the systems, articles, and related methods as described herein. Rather, the exemplary embodiment can be implemented and utilized in connection with many applications in which a progressive jackpot is desired.

Although specific features of various embodiments of the present disclosure may be shown in some drawings and not in others, this is for convenience only. In accordance with the principles of the present disclosure, any feature of a drawing may be referenced and/or claimed in combination with any feature of any other drawing.

This written description uses examples to disclose the embodiments of the present disclosure, including the best mode, and also to enable any person skilled in the art to practice the disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An electronic gaming system comprising:
- a memory; and
- a processor configured to execute instructions stored in the memory, which when executed, cause the processor to:
  - store, in the memory, a first bet multiplier for a first progressive jackpot, the first bet multiplier representing a first multiplication factor;
  - compare symbols of an outcome of a first play instance to one or more in-game events;
  - determine, based on the comparison, that at least one of the outcome symbols corresponds to a first in-game event, wherein the first in-game event is associated with a first game award having a first value, and wherein the first value is awarded to a player;
  - apply the first bet multiplier to the first value to increase the first value by the first multiplication factor; and
  - bulk increment the first progressive jackpot by the increased first value.

2. The gaming system of claim 1, wherein the memory stores a plurality of reel strips including a plurality of symbols thereon, and wherein execution of the instructions further causes the processor to determine the outcome symbols by simulating spinning and stopping of the plurality of reel strips.

3. The gaming system of claim 1, wherein execution of the instructions further causes the processor to cause display of the bulk incremented first progressive jackpot at a remote device, thereby visually alerting the player to a leap in the total value of the first progressive jackpot caused by the first in-game event.

4. The gaming system of claim 3, wherein the memory and processor are provided on a gaming server in communication with the remote device, and wherein execution of the instructions further causes the processor to cause display, at the remote device, of spinning and stopping of a plurality of reel strips to display symbols from each of the reel strips.

5. The gaming system of claim 1, wherein the memory stores at least one paytable and wherein execution of the instructions further causes the processor to perform a lookup in the at least one paytable to compare the outcome symbols to the one or more in-game events.

6. The gaming system of claim 1, wherein the instructions, when executed by the processor, further cause the processor to:
- determine, based on the comparison, that at least one of the outcome symbols corresponds to a second in-game event, wherein the second in-game event is associated with a second game award having a second value, and wherein the second value is awarded to the player; and
- add the second value of the second game award to a second progressive jackpot as an increment to the second progressive jackpot.

7. The gaming system of claim 6, wherein the memory stores a first paytable specifying a first plurality of values for the first in-game event, and a second paytable specifying a second plurality of values for the second in-game event, each of the first plurality of values and the second plurality of values being associated with a particular symbol combination, wherein the second plurality of values are each less than the first plurality of values for each symbol combination.

8. The gaming system of claim 1, wherein execution of the instructions further causes the processor to add, in conjunction with the first value, a portion of a total bet value to the first progressive jackpot.

9. The gaming system of claim 1, wherein execution of the instructions further causes the processor to:
- identify a bonus game paytable that includes a column for each in-game event of a plurality of in-game events, a row for each in-game event ordinal, and wherein each cell in the bonus game paytable includes a bet multiplier of that cell; and
- access the bonus game paytable to identify the first bet multiplier by using the determined first in-game event as the column of the bonus game paytable and using an ordinal of in-game events as the row of the bonus game paytable.

10. At least one non-transitory computer-readable medium containing instructions embodied thereon, which when executed by at least one processor, cause the at least one processor to:

identify, from at least one memory, a first bet multiplier for a first progressive amount, the first bet multiplier representing a first multiplication factor;

evaluate symbols of an outcome of a first play instance by comparing each of the outcome symbols to one or more in-game events;

determine, based on the evaluation, that at least one of the outcome symbols corresponds to a first in-game event, wherein the first in-game event is associated with a first game output having a first value;

cause the first value to be presented for the first play instance;

apply the first bet multiplier to the first value to increase the first value by the first multiplication factor; and add the increased first value to the first progressive amount.

11. The at least one non-transitory computer-readable storage medium of claim 10, wherein the at least one memory stores a plurality of reel strips including a plurality of symbols thereon, and wherein execution of the instructions further causes the at least one processor to determine the outcome symbols by simulating spinning and stopping of the plurality of reels strips.

12. The at least one non-transitory computer-readable storage medium of claim 10, wherein execution of the instructions further causes the at least one processor to cause display of the increased first progressive amount at a remote device, thereby visually alerting a player to a leap in the total value of the first progressive amount caused by the first in-game event.

13. The at least one non-transitory computer-readable storage medium of claim 12, wherein the at least one non-transitory computer-readable storage medium and at least one processor are provided on a gaming server in communication with the remote device, and wherein execution of the instructions further causes the at least one processor to cause display, at the remote device, of spinning and stopping of a plurality of reel strips to display symbols from each of the reel strips.

14. The at least one non-transitory computer-readable storage medium of claim 11, wherein the at least one memory stores at least one paytable and wherein execution of the instructions further causes the at least one processor to perform a lookup in the at least one paytable to compare the outcome symbols to the one or more in-game events.

15. The at least one non-transitory computer-readable storage medium of claim 11, wherein the instructions, when executed by the at least one processor, further cause the at least one processor to:

determine, based on the evaluation, that at least one of the outcome symbols corresponds to a second in-game event, wherein the second in-game event is associated with a second game award having a second value, and wherein the second value is awarded for the first play instance; and add the second value of the second game award to a second progressive amount as an increment to the second progressive amount.

16. A method for providing a game on an electronic gaming system comprising the steps of:

storing, in a memory, a first bet multiplier for a first progressive award, the first bet multiplier representing a first multiplication factor;

comparing symbols of an outcome of a first play instance to one or more in-game events;

determining, based on the comparison, that at least one of the outcome symbols corresponds to a first in-game event, wherein the first in-game event is associated with a first game outcome amount having a first value, and wherein the first value is awarded to a player;

applying the first bet multiplier to the first value to increase the first value by the first multiplication factor; and bulk incrementing the first progressive award by the increased first value.

17. The method of claim 16 further comprising:

causing display of the bulk incremented first progressive award at a remote device, thereby visually alerting the player to a leap in the total value of the first progressive award caused by the first in-game event.

18. The method of claim 17, wherein the method is performed by a gaming server in communication with the remote device, and wherein the method further comprises causing display, at the remote device, of spinning and stopping of a plurality of reel strips to display symbols from each of the reel strips.

19. The method of claim 16 further comprising:

determining, based on the comparison, that at least one of the outcome symbols corresponds to a second in-game event, wherein the second in-game event is associated with a second game award having a second value, and wherein the second value is awarded to the player; and adding the second value of the second game award to a second progressive award as an increment to the second progressive award.

20. The method of claim 19, wherein the memory stores a first paytable specifying a first plurality of values for the first in-game event, and a second paytable specifying a second plurality of values for the second in-game event, each of the first plurality of values and the second plurality of values being associated with a particular symbol combination, wherein the second plurality of values are each less than the first plurality of values for each symbol combination.

* * * * *